United States Patent Office 3,088,873
Patented May 7, 1963

3,088,873
4-CHLORO-3-SULPHAMYL BENZOIC ACID AND SALTS
Vladimir Petrow, Oliver Stephenson, and Anthony Musgrave Wild, all of London, England, assignors to The British Drug Houses Limited
No Drawing. Filed Feb. 7, 1961, Ser. No. 87,528
Claims priority, application Great Britain Feb. 16, 1960
6 Claims. (Cl. 167—65)

The invention relates to organic compounds and has particular reference to 4-chloro-3-sulphamyl benzoic acid and its non-toxic alkali metal salts.

It is an object of the present invention to provide the new compound, 4-chloro-3-sulphamyl benzoic acid, having the Formula I

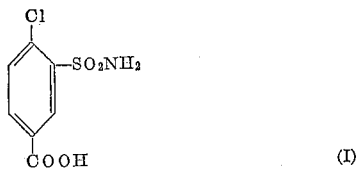

and its non-toxic pharmaceutically acceptable alkali metal salts, which are of value on account of their diuretic and/or natriuretic properties.

It is a further object of the present invention to provide pharmaceutical preparations of 4-chloro-3-sulphamyl benzoic acid and non-toxic pharmaceutically acceptable alkali metal salts thereof.

4-chloro-3-sulphamyl benzoic acid and its salts are potent oral diuretic agents of completely novel structure. The free acid, in striking contrast to the 1-3-disulphamyl derivatives of benzene, possesses only only very low activity as an inhibitor of the enzyme carbonic anhydrase (being only about one hundredth as potent as acetazolamide in this connection). It can therefore be safely administered for long periods and as an oral diuretic it brings about a highly favourable excretion of sodium ($Na^+$) and chloride ($Cl^-$) ions with only minimal excretion of potassium ($K^+$); additionally it is of low toxicity.

According to the present invention there is provided a process for the preparation of 4-chloro-3-sulphamyl benzoic acid and alkali metal salts thereof which comprises reacting 4-chloro-3-chlorosulphonyl benzoic acid with ammonia or its chemical equivalents and if desired reacting the resulting benzoic acid with an alkali metal hydroxide.

The preparation of 4-chloro-3-chlorosulphonyl benzoic acid may be effected by methods known to those skilled in the art or by reaction of 4-chlorobenzoic acid with chlorosulphonic acid as hereinafter described.

Reaction between the sulphonchloride and ammonia to yield the sulphonamide (I) is preferably effected with liquid ammonia or concentrated ammonium hydroxide (preferably of d.=0.880). Less conveniently, conversion to the sulphonamide (I) may be achieved using gaseous ammonia in a variety of organic solvents including 1,2-dichloroethane and dioxan. Chemical equivalents of ammonia are to be understood as including ammonium carbonate and sodamide.

Alkali metal salts of the sulphonamide (I) may be prepared by dissolving the sulphonamide in an aqueous, aqueous alcoholic or alcoholic solution of the alkali metal hydroxide (or carbonate) and, if desired, isolating the salt by evaporating the solvent. The pharmaceutically acceptable alkali metal salts, such as the sodium, potassium and lithium salts, may be prepared in this manner.

It will be appreciated by those skilled in the art that the sulphonamide (I) forms both mono- and di-alkali metal salts, the former by reaction of the carboxyl group and the latter by reaction of both carboxyl and sulphonamide groups with the alkali metal salt.

4-chloro-3-sulphamyl benzoic acid (I) is a highly active diuretic agent on oral administration as well as upon injection, and may be administered in therapeutic dosages in conventional vehicles applicable to drugs active by these routes. Thus the compound may be administered in the form of tablets, which form of presentation is preferred. Alternatively, as the compound is soluble in dilute alkaline media and in polyethylene glycol solutions, injectable solutions can be prepared by dissolving the compound in the selected medium to which preservatives can be added if desired.

Following is a description by way of example of methods of carrying the invention into effect.

EXAMPLE 1

*(a) Preparation of 4-Chloro-3-Chlorosulphonyl-Benzoic Acid*

A mixture of 4-chlorobenzoic acid (78.3 g.), pentachloroethane (102 g.) and chlorosulphonic acid (233 g.) was heated at reflux temperature for 6 hours. The mixture was then cooled and poured carefully with stirring on to chopped ice. The product which separated was collected, washed with ice-cold water, and drained as far as possible. It was pure enough at this stage for reactions with ammonia as described in the following examples. A portion of the sulphonchloride purified by crystallisation from a mixture of 1,2-dichloroethane and light petroleum (B.P. 60 to 80° C.) had M.P. 168 to 170° C.

*(b) Preparation of 4-Chloro-3-Sulphamyl Benzoic Acid*

The sulphonchloride (76 g.) prepared as described above, was added with stirring to liquid ammonia (ca. 700 ml.) and the excess of ammonia was then removed by warming. The residue was dissolved in hot water, decolorised by the addition of a little animal charcoal, filtered and the filtrate cooled and acidified with concentrated hydrochloric acid. The product which separated on cooling was purified by crystallisation from water and had M.P. 260.5 to 262° C. (corr.).

EXAMPLE 2

*Preparation of 4-Chloro-3-Sulphamyl Benzoic Acid*

4-chloro-3-chlorosulphonyl benzoic acid (25 g.), prepared as described in Example 1, was added in portions with stirring to aqueous ammonia (250 ml., d.=0.880). When the addition was complete the solution was allowed to stand at room temperature for 30 minutes. Excess of ammonia was removed by boiling and the cooled solution was then acidified with concentrated hydrochloric acid. The product which separated was collected and prified by crystallisation from water and had M.P. 260.5 to 262° C. (corr.).

EXAMPLE 3

*Preparation of Mono-Potassium Salt of 4-Chloro-3-Sulphamyl Benzoic Acid*

A solution of 4-chloro-3-sulphamyl benzoic acid (23.55 g.) in warm isopropanol (250 ml.) was treated with stirring with a solution of potassium hydroxide (5.6 g.) in water (10 ml.). The crystalline potassium salt separated rapidly on cooling and was collected, washed with cold isopropanol and dried at 90° C. It dissolved readily in cold water to give a neutral solution.

EXAMPLE 4

*Preparation of Mono-Sodium Salt of 4-Chloro-3-Sulphamyl Benzoic Acid*

A solution of 4-chloro-3-sulphamyl benzoic acid (23.55 g.) in hot ethanol (250 ml.) was treated with stirring with a solution of sodium ethoxide [prepared by dissolving sodium (2.3 g.) in ethanol (40 ml.)] when the salt separated rapidly. The solution was cooled, the sodium salt collected and washed with ethanol and dried at 90° C. The salt was readily soluble in water to give a neutral solution.

EXAMPLE 5

*Preparation of Di-Sodium Salt of 4-Chloro-3-Sulphamyl Benzoic Acid*

A solution of 4-chloro-3-sulphamyl benzoic acid (23.55 g.) in ethanol (200 ml.) at 60 to 70° C. was added slowly with stirring to a solution of sodium ethoxide [prepared by dissolving sodium (4.6 g.) in ethanol (200 ml.)] at the same temperature. The mixture was cooled, the product collected, washed with ethanol and dried. It was readily soluble in water giving a solution of pH ca. 11.

EXAMPLE 6

*Preparation of 4-Chloro-3-Sulphamyl Benzoic Acid*

A solution of 4-chloro-3-chlorosulphonyl benzoic acid (25.5 g.) [prepared as described in Example 1(a)] in toluene (250 ml.) was added dropwise to a stirred suspension of sodamide (8 g.) in toluene (100 ml.). When the addition was complete, the mixture was heated on the steam-bath for 30 minutes. It was then cooled, still stirring, and acidified carefully with hydrochloric acid (2 N). The solid product was collected and purified by crystallisation from water. It had M.P. 260.5 to 262° C. (corr.).

EXAMPLE 7

Compressed scored tablet comprising 100 mg. active ingredient.

| | |
|---|---|
| 4-chloro-3-sulphamyl benzoic acid | 100 g. |
| Lactose | 63 g. |
| Starch paste, 10 percent w./v | A sufficient quantity. |
| Magnesium stearate | 1.9 g. |
| Starch, sufficient to make | 194.4 g. |

The lactose and two-thirds of the starch were thoroughly mixed with the 4-chloro-3-sulphamyl benzoic acid and moistened with sufficient starch paste. The mass was passed through a 20 mesh sieve, followed by drying of the granulation at 50° C. The resultant granule was re-processed through a sieve of comparable aperture, and mixed with the magnesium stearate and sufficient starch to produce the required weight. The mixture was compressed to produce 1000 tablets each weighing 194.4 mg. (3 grains).

EXAMPLE 8

Compressed scored tablets comprising 100 mg. of active ingredient in the form of monosodium salt.

| | |
|---|---|
| 4-chloro-3-sulphamyl benzoic acid, monosodium salt | 109.4 g. |
| Lactose | 53.5 g. |
| Starch paste, 10 percent w./v | A sufficient quantity. |
| Magnesium stearate | 1.9 g. |
| Starch, sufficient to make | 194.4 g. |

The lactose and two-thirds of the starch were thoroughly mixed with the 4-chloro-3-sulphamyl benzoic acid, monosodium salt and moistened with sufficient starch paste. The mass was passed through a 20 mesh sieve, followed by drying of the granulation at 50° C. The resulting granule was reprocessed through a sieve of comparable aperture, and mixed with the magnesium stearate and sufficient starch to produce the required weight. The mixture was compressed to produce 1000 tablets each weighing 194.4 mg. (3 grains).

We claim:
1. 4-chloro-3-sulphamyl benzoic acid.
2. A compound selected from the group consisting of the sodium, potassium and lithium salts of 4-chloro-3-sulphamyl benzoic acid.
3. Mono-sodium salt of 4-chloro-3-sulphamyl benzoic acid.
4. Mono-potassium salt of 4-chloro-3-sulphamyl benzoic acid.
5. Di-sodium salt of 4-chloro-3-sulphamyl benzoic acid.
6. A pharmaceutical preparation in compressed tablet form comprising as its essential active ingredient a compound selected from the group consisting of 4-chloro-3-sulphamyl benzoic acid and the sodium, potassium and lithium salts thereof, said active ingredient being admixed with pharmaceutical carriers comprising magnesium stearate, starch and lactose.

References Cited in the file of this patent

UNITED STATES PATENTS

| | | |
|---|---|---|
| 2,079,541 | Battegay | May 4, 1937 |
| 3,042,581 | Penau et al. | July 3, 1962 |

OTHER REFERENCES

Ruggli et al.: Chemical Abstracts, vol. 39, page 4858 (1945). (Copy in Library.)

Ephraim: Inorganic Chemistry, page 610 (1947). (Copy in Division 38.)